UNITED STATES PATENT OFFICE.

ALBERT NEUMANN, OF BERLIN, GERMANY, ASSIGNOR TO THE FARBEN-FABRIKEN OF ELBERFELD COMPANY, OF NEW YORK.

MEDICINAL COMPOUND AND PROCESS OF MAKING SAME.

SPECIFICATION forming part of Letters Patent No. 633,289, dated September 19, 1899.

Application filed August 9, 1898. Serial No. 688,193. (No specimens.)

*To all whom it may concern:*

Be it known that I, ALBERT NEUMANN, doctor of philosophy, residing at Berlin, Germany, (assignor to the FARBENFABRIKEN OF ELBERFELD COMPANY, of New York,) have invented a new and useful Improvement in the Manufacture of Chemical Compounds Containing Phosphorus; and I hereby declare the following to be a clear and exact description of my invention.

My invention relates to the production of a new compound containing phosphorus, which I term "nucleothyminic acid" and which exhibits, according to my researches, therapeutical properties.

In producing this compound I start from the body discovered by myself and described in my German Patent No. 103,062 and known as "nucleïnic acid B." This product is obtained by causing alkalies to act with or without the addition of organic salts at elevated temperatures on such organs or humors of the animal organism as contain cells capable of development—such, for instance, as the thymus glands, the milt, the testicles, or the like.

I now describe the production of the nucleothyminic acid.

It is obtained from the nucleïnic acid B by treating the latter with warm water at from 50° to 60° centigrade. In carrying out this process practically I can proceed as follows: One part of the nucleïnic acid B is as quickly as possible dissolved in twenty parts of warm water at about 60° centigrade under energetic stirring. The resulting solution is filtered and when cool poured into sixty parts of acidulated alcohol, (which contains fifteen cubic centimeters of concentrated hydrochloric acid on each liter of alcohol.) Thus the new acid is precipitated, which in order to be purified is filtered, washed with alcohol, redissolved in the tenfold quantity of cold water, and again precipitated from the resulting solution in the manner above described. The resulting precipitate is filtered and dried at low temperatures. When dry, the new acid represents a slightly-yellow-colored dusty powder, which is easily soluble in cold water and in a dilute caustic lye. On adding dilute hydrochloric acid to a cold concentrated watery solution of the acid the latter is precipitated in the shape of a white voluminous precipitate. If to a watery solution of the new compound an excess of concentrated hydrochloric acid and a small quantity of phloroglucine is added and the resulting solution is heated for a short while in a water-bath, a cherry-red solution is obtained.

The new acid contains phosphorus, which can easily be recognized by analysis.

Having now described my invention and in what manner the same is to be performed, what I claim as new, and desire to secure by Letters Patent, is—

1. The process for the production of the new chemical compound nucleothyminic acid which process consists in first treating the nucleïnic acid B, which is obtained by acting with alkalies at elevated temperatures on organs of the animal organism containing cells capable of development, with warm water at about 50° to 60° centigrade; secondly precipitating the so-produced nucleothyminic acid from the solution thus obtained by means of hydrochloric acid; thirdly filtering the resulting precipitate and drying it at low temperatures, substantially as hereinbefore described.

2. As a new article of manufacture the new compound containing phosphorus and termed "nucleothyminic acid" being a slightly-yellow-colored dusty powder which is soluble in cold water, from which solution it is precipitated by means of dilute hydrochloric acid, the watery solution assuming a cherry-red color when it is heated for a short while after being previously mixed with an excess of concentrated hydrochloric acid and a small quantity of phloroglucine, substantially as hereinbefore described.

In testimony whereof I have signed my name in the presence of two subscribing witnesses.

ALBERT NEUMANN.

Witnesses:
 OTTO KALISCHER,
 EDWARD L. WHITNEY.